May 23, 1961 P. S. DICKEY 2,985,153
VAPOR GENERATION AND SUPERHEATING
Filed Dec. 7, 1951 9 Sheets-Sheet 1

INVENTOR.
PAUL S. DICKEY
BY
Raymond W. Jenkins
ATTORNEY

May 23, 1961    P. S. DICKEY    2,985,153
VAPOR GENERATION AND SUPERHEATING
Filed Dec. 7, 1951    9 Sheets-Sheet 2

INVENTOR.
PAUL S. DICKEY
BY
Raymond W. Junkins
ATTORNEY

May 23, 1961  P. S. DICKEY  2,985,153
VAPOR GENERATION AND SUPERHEATING
Filed Dec. 7, 1951  9 Sheets-Sheet 5

INVENTOR.
PAUL S. DICKEY
BY
Raymond W. Junkins
ATTORNEY

May 23, 1961 P. S. DICKEY 2,985,153
VAPOR GENERATION AND SUPERHEATING
Filed Dec. 7, 1951 9 Sheets-Sheet 7

INVENTOR.
PAUL S. DICKEY
BY
Raymond W. Jenkins
ATTORNEY

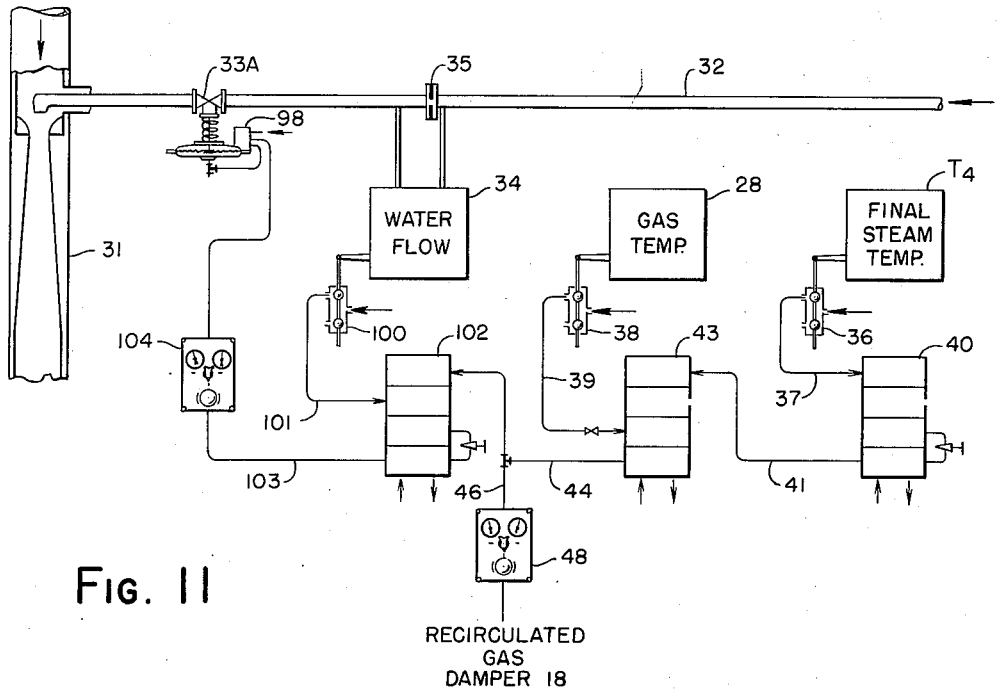
FIG. 11
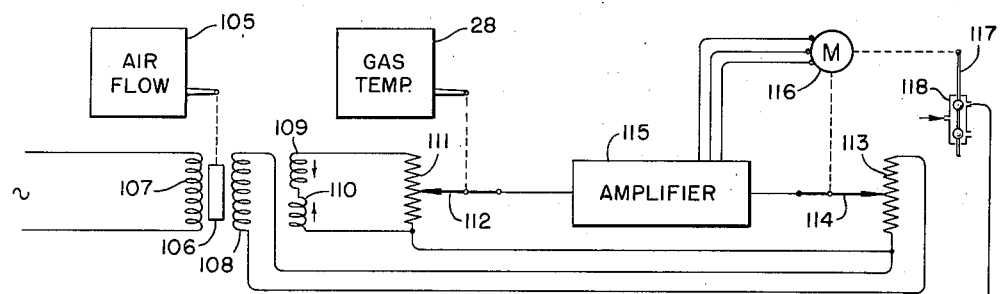
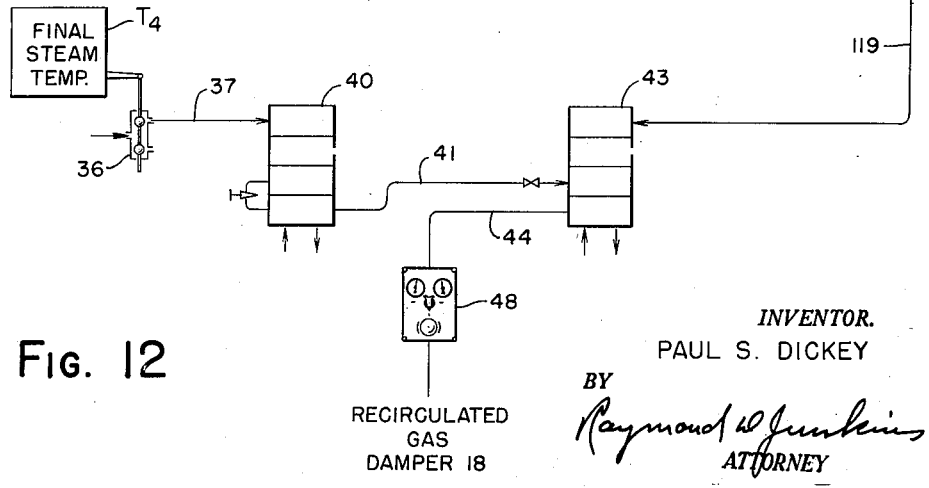
FIG. 12
*INVENTOR.*
PAUL S. DICKEY
BY
Raymond W Junkins
*ATTORNEY*

2,985,153
Patented May 23, 1961

2,985,153

VAPOR GENERATION AND SUPERHEATING

Paul S. Dickey, East Cleveland, Ohio, assignor to Bailey Meter Company, a corporation of Delaware Filed Dec. 7, 1951, Ser. No. 260,357

22 Claims. (Cl. 122—479)

My invention lies in the field of steam power generation and particularly in the control of steam temperature in connection with present day vapor generators. Practically all central station capacity presently being installed, or on order, in the United States has rated steam conditions above 800 p.s.i.g. and 800 FTT; the higher operating temperature being 1050 FTT at pressures from 1500 p.s.i.g. to 2000 p.s.i.g. and rated load from 500,000 to 1,000,000 lb. per hr. The problems involved in the generation and close control of the properties of steam are quite different now than was the case at the time of the inventions in this field which are shown in the prior art.

Superheat temperature control is particularly desirable in the generation of steam for the production of electrical energy in large central station power plants. In such plants, the upper limit of superheat temperature is governed by the materials and construction of the turbines served by the steam. In the interest of turbine efficiency the temperature of the steam delivered to the turbine should be maintained within close optimum limits throughout a wide range of capacities.

As feed water temperatures progressively increase there is less and less work for the boiler proper, with the result that its convection heat-absorbing surface has disappeared to the point where the modern large unit consists of a water-walled furnace, a convection superheater, in some instances a convection reheating surface, an economizer and an air heater.

With the superheating or resuperheating of the steam in one or more convection type heat exchange surfaces, the size and cost of such surfaces becomes a material factor in the total cost of the unit and any improvement leading to a reduction in the size of superheaters becomes of considerable importance. Usually these surfaces must be made of expensive high-alloy tubing to satisfactorily handle the temperatures and pressures encountered.

It is thus a prime desideratum, in the design of such a unit, to proportion the steam generating surfaces and the steam superheating surfaces to give a desired final steam temperature at "rated load." At "peak load," in excess of the rated load, the final steam temperature will be in excess of that desired and correspondingly at lower rating the steam temperature will not equal that desired. This is due to the characteristic curve of convection type heat exchangers which have a rising function with load (Fig. 3). It is false economy to design the superheater for desired final steam temperature at "peak load," for at all loads below that value, the unit would produce steam which is below the desired final temperature. On the other hand, the design of a superheater to produce the desired final steam temperature at some rating below "rated load" would require an excessive cost of superheating surface and an excessive final steam temperature throughout the upper rating, with consequent danger to the turbine or the necessity of extracting some of the surplus heat from the final superheated steam.

To reach the desired high superheated steam temperature, but not to exceed it, requires exceedingly careful proportioning of the heat absorbing surfaces both for generating steam and for superheating it. But even if the desired superheated steam temperature be just attained initially by very careful designing at "rated load," the superheated steam temperature will vary during operation by reason of changes in cleanliness of the heat absorbing surfaces. Slag will form and adhere to the heat absorbing surfaces in the furnace thereby reducing the effectiveness of such surfaces and raising the furnace outlet temperature of the products of combustion. Furnace outlet temperature will also change with percentage of excess air supplied for combustion, with the characteristics of the fuel burned, and with the rate of combustion and the corresponding rate of steam generation. All of these things will therefore affect the temperature of the gases, whether the superheating elements are located in the furnace where they absorb heat by radiation from the burning fuel and products of combustion, or whether they are located beyond the furnace where they absorb heat by convection only from the products of combustion.

With the furnace volume, as well as the vapor generating furnace surface, and the vapor superheating surface, fixed and invariable, the possibility of satisfactorily controlling the final steam temperature lies in controlling the volume and temperature of the gases contacting the superheating surfaces. Fuel and air supply must be varied with rating or demand to provide the desired steam flow rate at the desired steam pressure. The furnace temperature of the flame and products of combustion does not vary greatly with rating. This leaves the controllable variable as the volume and temperature of the gases entering the convection superheating surfaces. The volume or mass flow rate has been controlled in the past through by-passing some of the gas flow around at least a portion of the superheating surfaces. In some instances water spray attemperation has been used to absorb excess heat from the steam at a preselected location in its flow path. The temperature of the entering gases may be controlled by selecting the amount of generating surface to be contacted by the gases before they enter the superheating surfaces or by controlling the temperature and mass flow of gases leaving the furnace through recirculating cooler products of combustion to the furnace.

For any given furnace, as load increases, the rate of heat absorption does not increase as rapidly as the rate of input; therefore, the furnace leaving temperature will rise. With both the quantity rate and the temperature of the gases leaving the furnace increasing with load, it is apparent that a fixed surface convention superheater will receive a greater heat rate at higher loads than at lower loads and the heat transfer area is usually designed for the volume and temperature of leaving gases at "rated load." Any further increase in heat release rate supplies to the fixed superheater surface more heat by gas volume and by gas temperature than it is designed for and a corresponding excessive final steam temperature is experienced. Correspondingly, at operation below the rated load the fixed superheater surface receives less volume and the lower temperature of gases leaving the furnace with corresponding lowering of final steam temperature leaving the superheater. It is therefore a principal object of my invention to provide an improved method and apparatus for extracting excessive heat from the steam at high ratings and for supplying additional heat to the steam at low ratings, to the end that the final steam temperature will approximate a uniform value over a range of operating ratings at each side of the "rated load" value.

I preferably consider a unit which has been designed to provide the desired final steam temperature at "rated load." Throughout an upper range of rating between the "rated load" and a "peak load," I controllably bypass at least a portion of the products of combustion around a portion of the steam superheating surfaces or, in other installations, I apply water spray attemperation. As rating decreases, below "rated load," I controllably decrease the percentage of liberated heat which is absorbed by the radiant generating surfaces. At the same time the leaving temperature of the gases of combustion is raised as well as the mass flow, to the end that a greater proportion of the liberated heat is delivered to the convection superheating surfaces. This control of the temperature and volume of combustion gases is accomplished by recirculating to the furnace a variable proportion of partially cooled products of combustion abstracted from the inlet side of the air heater. The exact location of entrance of the recirculated gases to the furnace is not a part of the present invention.

A principal object of my invention is to provide an improved method and control system effective in positioning the by-pass damper or the attemperator control valve and in controlling the recirculation of gases.

Recirculation of partially cooled products of combustion is not a new device. With a water cooled furnace it is known that the heat availability of the gases at the entrance to convection superheating surfaces is increased when the percentage recirculated is increased as rating decreases. This may be due to relative increase in gas temperature and/or mass flow. The lower rating end of the convection characteristic curve is raised while the upper end may actually be lowered. The controlled change in temperature and/or mass flow rate of the gases leaving the furnace may result from different effects of the introduction of recirculated gases at different furnace locations. One theory that has been advanced is of delayed combustion and change in temperature of the combustion process. Another is the blanketing or shielding effect of the recirculated gases between the combustion process and the radiant receiving walls. Still other causes may be the dilution of the fresh products of combustion and the heating up of the recirculated gases. Actually relatively small amounts of the products of combustion are recirculated. As rating decreases from "rated load" the rate of gas recirculation is increased thus relatively decreasing the absorption of heat by the radiant generating surface while relatively increasing both the volume flow rate and temperature of the gases leaving the combustion zone and entering the superheating surfaces. The present invention provides a control of the recirculation of products of combustion to lower the radiant heat absorption with decrease in rating and thus increase the volume and temperature of the gases leaving the furnace and entering the superheating surfaces.

My present invention has as a primary object method and apparatus for operating, and controlling the operation of, such a vapor generating unit through the utilization of more advantageous indexes of heat availability to the convection superheater and of operation of the unit as a whole.

So far as I am aware no one has previously used the actual entering gas temperature as an element in method and apparatus for controlling steam final temperature on units of the type under discussion equipped for the recirculation of heated products of combustion to the furnace. Attempts have been made to ascertain continuously the temperature within the superheater tubes near the entrance, near the exit and at intermediate locations. Attempts have also been made to obtain the temperature of the steam before it enters the convection superheater and to use this temperature measurement in conjunction with the final steam temperature, in controlling spray attemperators, gas bypasses, and the like. These methods and arrangements have not been entirely satisfactory. A considerable time and heat lag occurs in the transfer of heat through the films and metal of the tube surfaces, and with rapidly fluctuating heat release loads and temperature effects as caused by slagging or deslagging of the furnace walls with corresponding fluctuating variations in heat absorption of the generating surface as well as flame drift around the furnace, has introduced lags in final steam temperature control systems with corresponding hunting and overshooting. Through the use of my invention I avoid these inaccuracies and adverse effects by utilizing the actual furnace gas exit temperature as an element in my control system to maintain final steam total temperature.

Figure 7:
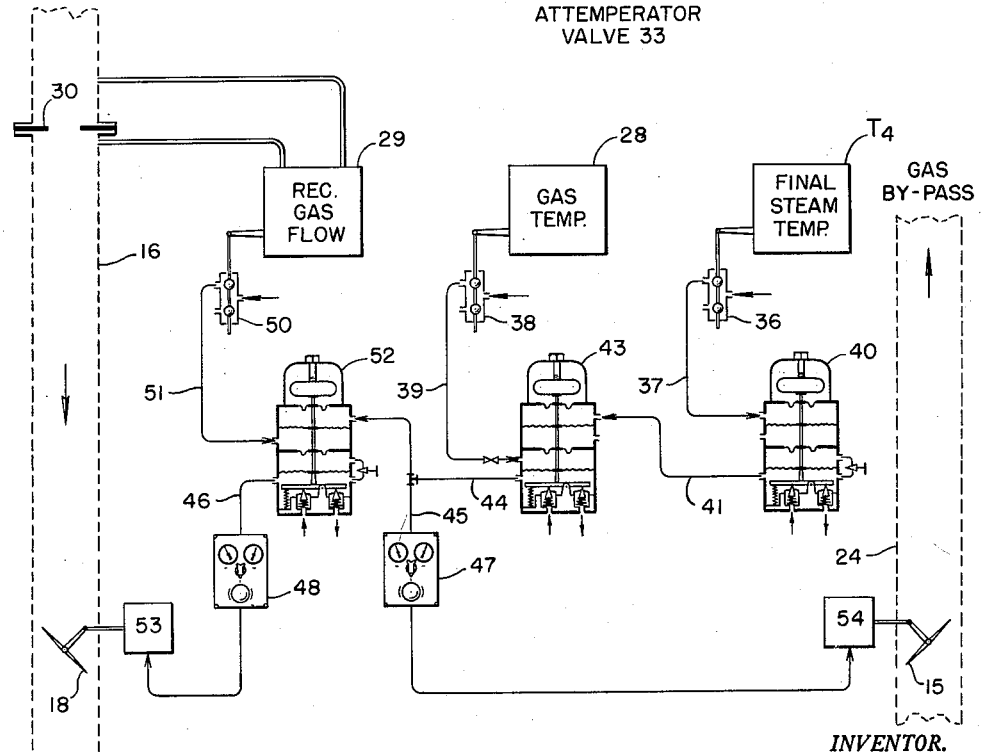
Fig. 7 is a schematic showing of a control system for recirculated gas and the gas by-pass, responsive to three variables in the operation of the unit.
Figure 8:
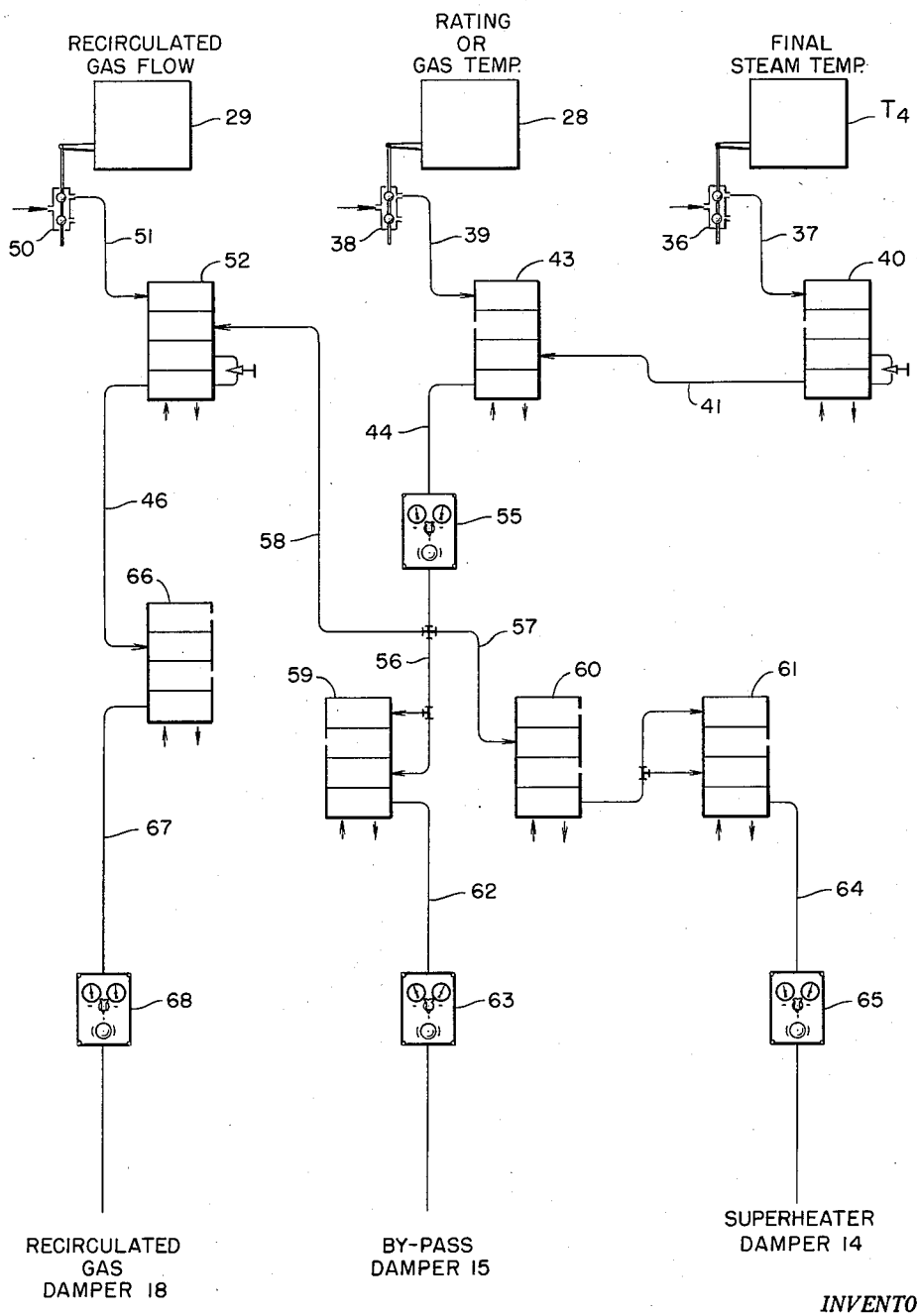

Fig. 8 diagrammatically shows a modification of Fig. 7.

Figure 9:
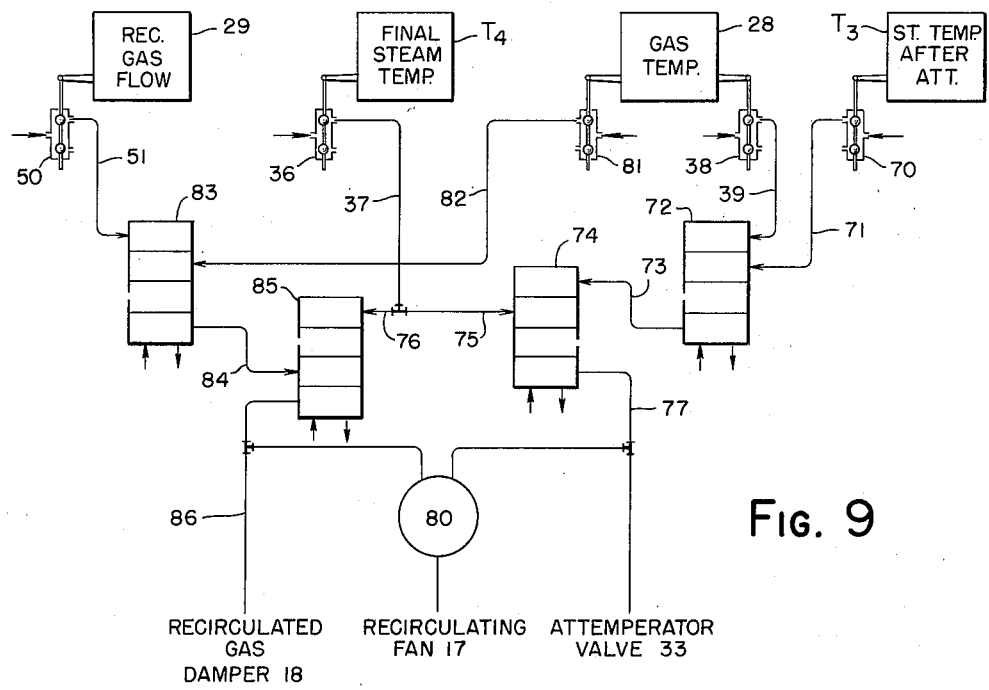

Fig. 9 is a schematic showing of a control system in connection with recirculated gas and an attemperator.

Figure 10:
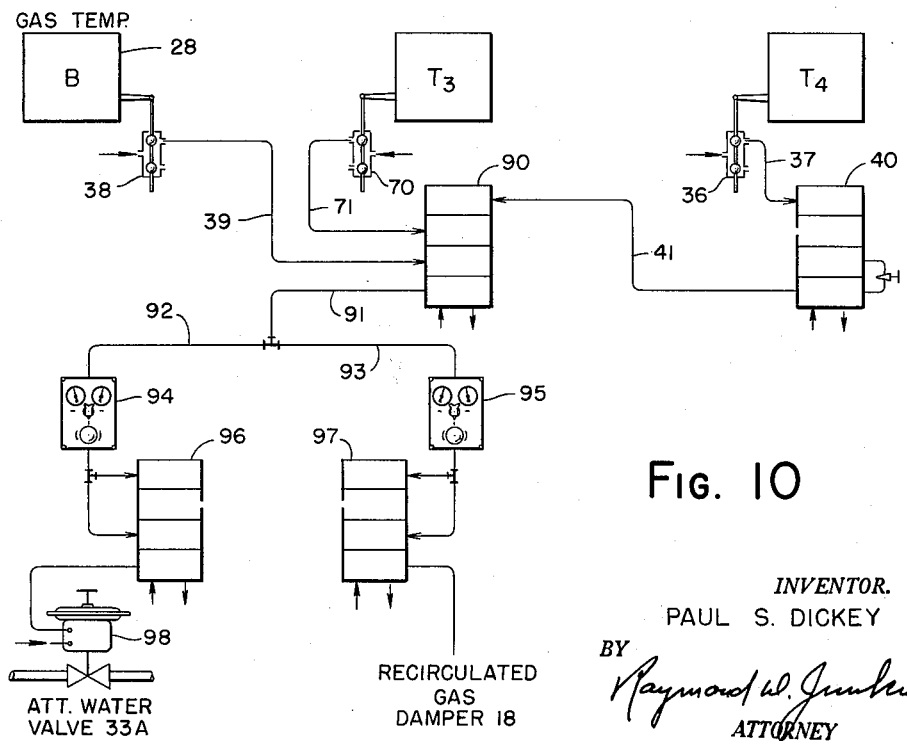

Fig. 10 is a somewhat different arrangement than Fig. 9 but is also for the control of gas recirculation and attemperation.

Fig. 11 diagrammatically represents a control of recirculated gas and an attemperator with a tie-back from attemperator water flow rate.

Fig. 12 diagrammatically illustrates a further embodiment of my invention.

Figure 13:
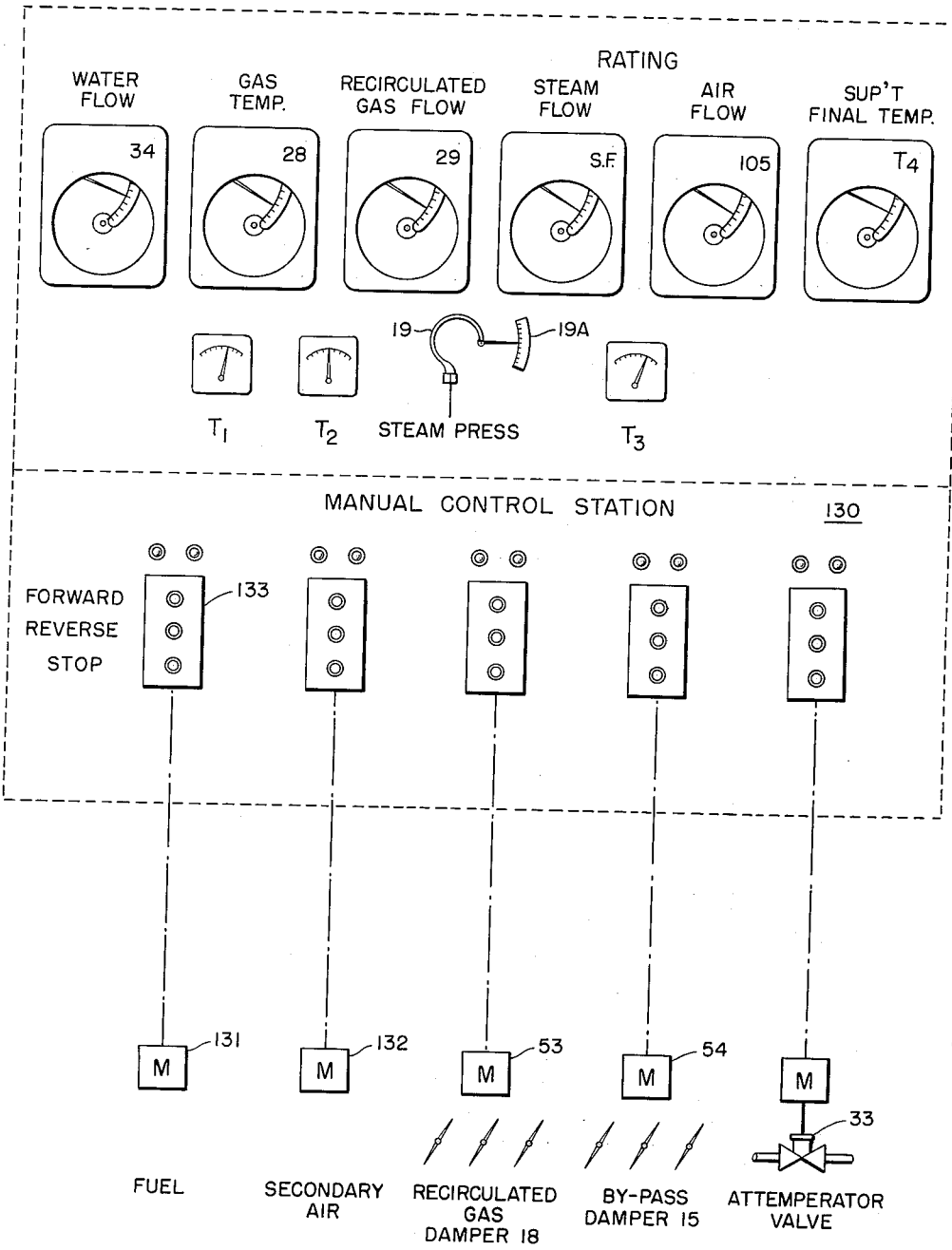

Fig. 13 is a diagram of indicators and controllers for manual performance of my improved method of operation.

It will be appreciated that I am illustrating and describing my invention in a preferred mode of operation and combination of apparatus. For example, while I speak of steam generation and superheating, the invention is useful in the generation and superheating of other vapors. Furthermore, while I particularly refer to the burning of pulverized coal in suspension, it will be understood that the invention is applicable to the burning of other fuels in suspension, such for example, as gas or oil.

In general it may be said that for a fixed design of furnace volume, steam generating surface, and steam superheating surface, with fuel and air supplied to satisfy demand, I preferably control the unit to raise the characteristic superheat curve (Fig. 3) below the "rated load" value and to lower the curve above the "rated load" value, so that a more uniform final steam temperature will be attained through a wider range of operating values, than would otherwise be the case. It will be appreciated that I preferably raise the curve at the lower ratings by gas recirculation and that I lower the curve at the upper ratings through either by-passing at least a portion of the heating gases around a portion of the superheating surfaces or through water spray attemperation.

Figure 1:
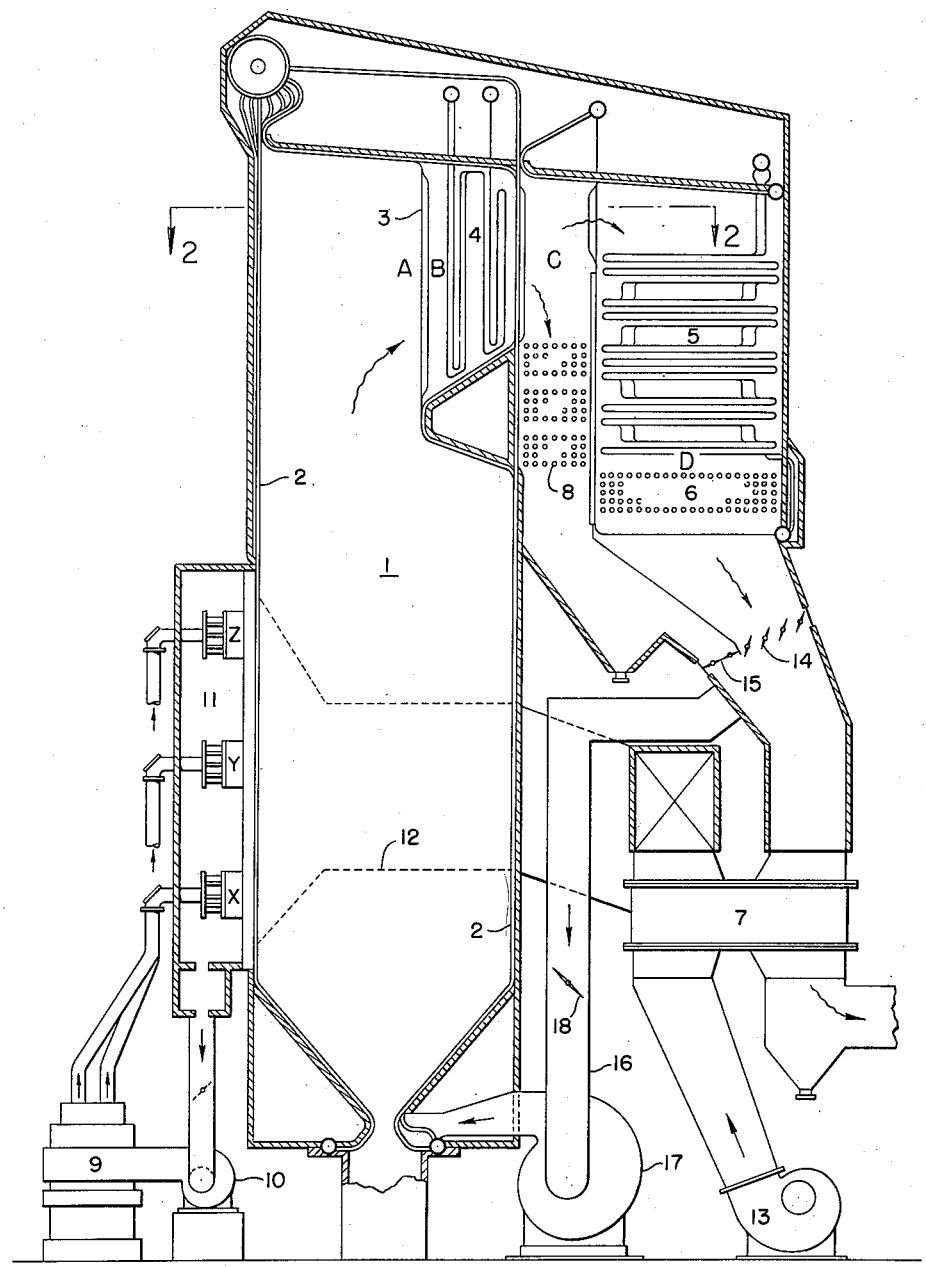
Fig. 1 is a somewhat diagrammatic sectional elevation of a vapor generating unit having radiant generating surfaces and convection superheating surfaces.
Figure 2:
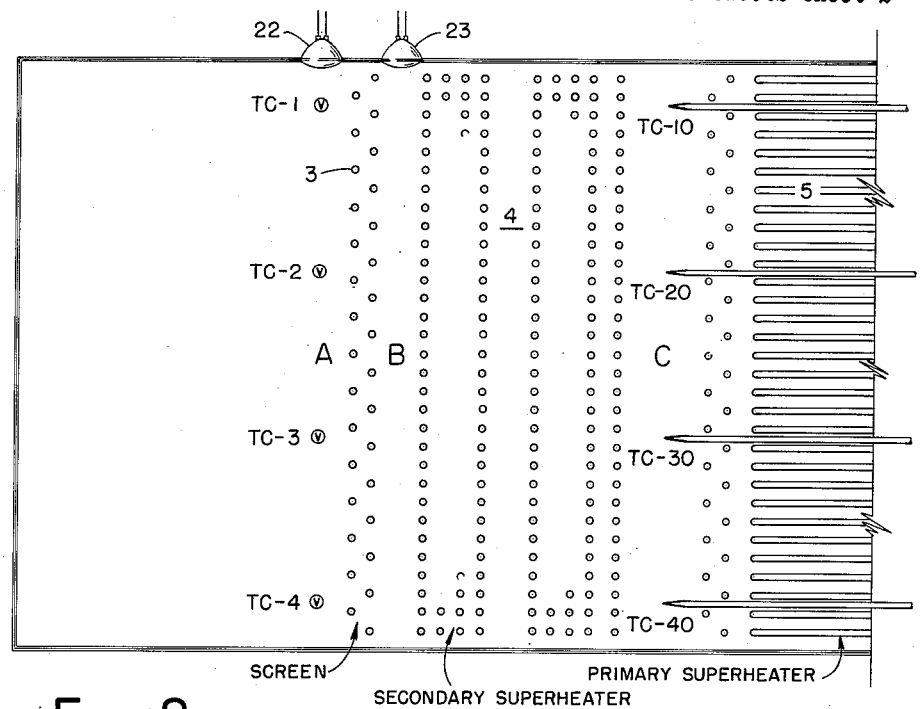
Fig. 2 is a section, to somewhat different scale, along the line 2—2 of Fig. 1, in the direction of the arrows.
Figure 3:
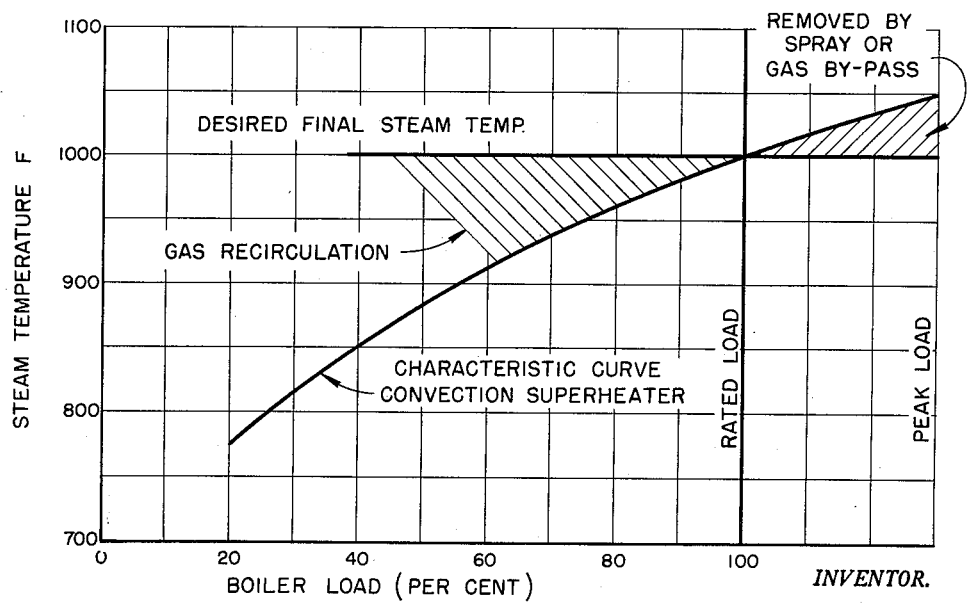
Fig. 3 is a graph of characteristic values in connection with the other figures of the drawing.

Fig. 1 shows in somewhat diagrammatic sectional elevation a typical vapor generator of the size and type herein contemplated and in connection with which I will explain my invention. Fig. 2 is a section, in the direction of the arrows, along the line 2—2 of Fig. 1. Reference may also be made to Fig. 3 to observe the normal characteristic curve of a convection superheating surface so designed as to produce final steam temperature 1000

FTT at 100% rated load. From this curve it will be observed that the expected final steam temperature would be in the neighborhood of 1050 FTT at peak load and would fall off throughout the lower ratings.

The generator is of the radiant type, having a furnace 1 which is fully water cooled with the walls 2 of vertical closely spaced plain tubes constituting the vapor generating portion of the unit. Products of combustion pass upwardly through the furnace 1 in the direction of the arrow, through a tube screen 3, over a secondary superheater surface 4, and then through a primary superheater 5 and economizer section 6 to an air heater 7. The numeral 8 designates another economizer section located in a parallel gas path.

Heated gases leaving the secondary superheater 4 may be divided through one path which includes the primary superheater 5 and the economizer section 6; or through a second path including the economizer section 8. The reunited flow of gases then passes through the air heater 7.

The unit is fired by three horizontal rows of burners which I have designated as X, Y and Z. There may be one or more burners in each horizontal row and the burners are supplied with fuel through a plurality of mills 9 and primary air fans 10. The additional secondary air for supporting combustion is supplied to a burner box 11 through one or more ducts 12 from the air heater 7. One or more forced draft fans 13 are shown but I have not shown the usual induced draft fan or fans at the outlet of the air heater 7 for aiding in the extraction of products of combustion from the unit to the stack.

The products of combustion passing over the surfaces 3, 4, 5 and 6 are controlled by dampers 14 while the products of combustion passing over the economizer surface 8 are controlled by the dampers 15. When the dampers 15 are closed then all of the products of combustion pass over the primary superheater 5 and the economizer portion 6.

At the entrance to the air heater 7, following the dampers 14 and 15, I join a duct 16 leading to a recirculation fan 17 which discharges to the hopper bottom of the combustion zone 1. Located in the duct 16 is a damper 18 and it is not important important in the present consideration to determine the exact location of this damper relative to the fan 17. It suffices to say that the damper 18 effectively controls the rate of flow of the gases recirculated to the furnace 1 when the 17 is in operation.

Preferably, the total supply of fuel and air to support combustion within the combustion zone 1 is under the control of an index of demand, such for example as steam pressure (Fig. 6) indicated as a Bourdon tube 19 arranged to position the movable element of a pneumatic pilot valve 20. Such control of supply of the elements of combustion is known and need not be herein more fully described. Another index of demand, rather than steam outflow pressure, may be used to control the supply rate of the elements of combustion.

I have found that a most desirable index of heat availability to superheat the steam is a continuous measure of the temperature of the gases immediately prior to their contacting the superheating surface. In a unit of the size and type being described the temperature of the gases first contacting the convection superheating surface should be in the neighborhood of 2000° F. for a steam temperature of 1000 FTT and under different conditions of operation will be in the range of 1700–2300° F. When there is a change in furnace exit gas temperature, for any reason, there is of necessity a time lag of heat transfer and metal temperature stabilization before the gas temperature change is reflected in final steam temperature change. Thus the use of actual gas temperature prior to convection heat exchange surfaces, as an operating guide or control index, anticipates the effect of this gas temperature change upon the superheating of the steam.

I have found it possible to provide a continuous determination of furnace exit gas temperatures by means of a bolometer or other radiation sensitive device as well as by bare thermocouples or high velocity thermocouples. In Fig. 1 I designate certain temperature determining locations to which reference will later be made. Representative of furnace exit gas temperature is location A at the entrance to tube screen 3; location B is the gas entrance to secondary superheater 4; C represents gas entrance temperature to the parallel gas passes. I expect that the gas temperatures at locations A or B will be in the range 1700–2300° F., while at location C the gas temperatures will be in a lower range as the heat of the gases is transferred to the steam.

I preferably employ a radiation sensitive device at locations A and B and will refer to a bolometer as satisfactorily representative. The bolometer of the Rutherford et al. Patent 2,524,478 has been successfully used as a device sensitive to total thermal radiation for producing an effect representative of the energy level of radiation received. The patent to English et al. No. 2,624,012 discloses and claims a circuit including the bolometer for actuating a recorder-controller in terms of temperature.

In Fig. 2 I show somewhat diagrammatically a section taken through the unit of Fig. 1, along the line 2—2, in the direction of the arrows. The locations A, B and C are not necessarily spot locations but are areas or planes between the various heat transfer surfaces. At 22 I designate a bolometer or other radiation receptive head sighted across A and at 23 a similar head sighted across B. These devices may preferably operate in the range 1700–2300° F. I have also found that bare metal thermocouples or high velocity thermocouples may be used to obtain gas temperatures at locations A and B if proper precautions are taken against the corrosive, and erosive, effect of the gases and entrained solid matter.

By way of example I illustrate in Fig. 2 four bare metal thermocouples TC–1, TC–2, TC–3 and TC–4 spaced across the area A in front of the screen tubes 3. These are preferably spaced across the screen tubes and are connected in series with each other in a measuring bridge network to obtain an average of the temperatures to which they are subjected. Preferably the thermocouples are suspended downwardly through the roof of the unit until the thermocouple ends are in a line across the entrance to the screen at about location A of Fig. 1. The thermocouple itself is encased in a thin wall protecting tube to protect it against erosive and corrosive action of the gases but may under certain conditions be barely exposed to the gases. When encased in a thin tube protector the latter is fastened to, and suspended from, an alloy tube which encases the lead wires upwardly to, and through, the roof. Such a construction has been found to have a reasonably long life and to satisfactorily obtain an accurate average of the temperatures across the location A.

A similar use of thermocouples may be had through the area B or the area C. In Fig. 2 I show an alternate possible construction where the thermocouples TC–10, TC–20, TC–30 and TC–40 are projected through horizontally from the rear of the unit assembly on supporting pipes which additionally act as protectors of the lead wires.

Regardless of the type of temperature sensitive device, or its mode of installation, the result is to obtain the actual temperature of the gases rather than any metal temperature or steam temperature in the various locations.

Figure 4:
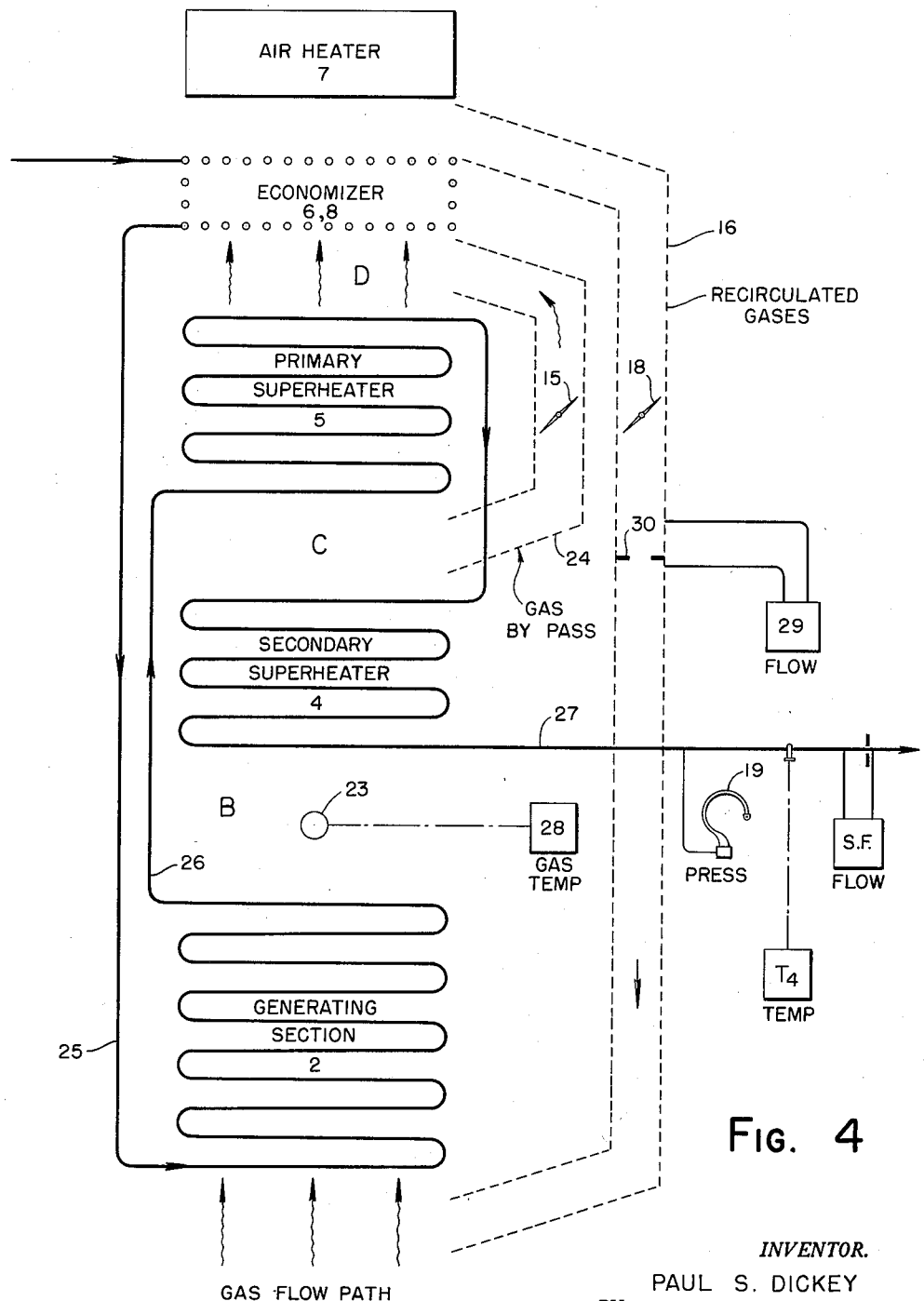
Fig. 4 is a diagrammatic showing of my invention in connection with gas by-pass and gas recirculation.

Referring now to Fig. 4 I show therein, in very diagrammatic form, the gas flow path in relation to the different heat exchange surfaces. The gases first contact the generating section 2 and then pass through the superheating surfaces prior to reaching the economizer and air heater. A by-pass 24 is diagrammatically shown around at least a portion of the superheating surfaces. I further show that the recirculating gas duct 16 joins the gas flow path at the entrance to the air heater 7 to recirculate gases to a location relatively near the entrance of generating section 2.

Feed water leaving the economizer 6, 8 joins the generating surface (diagrammatically) through a pipe 25 and steam leaves the generating section through a pipe 26 to enter the primary superheater 5. Vapor leaving the primary superheater 5 passes through the secondary superheater 4 and leaves the unit through a main steam line 27 to a turbine or other utilizer.

In connection with the steam outflow pipe 27 I provide a rate of flow meter SF, a device $T_4$ sensitive to final steam temperature, and a pressure sensitive Bourdon tube 19 previously referred to. The bolometer 23, at location B, is shown diagrammatically connected to a gas temperature measuring device 28.

In Fig. 4 I have not shown any representation of the fuel supply system or of various control instrumentalities which may be said to be intermediate the measuring devices 28, 19, $T_4$, SF, or 29, and the controlled dampers 15 and 18. Reference to other figures of the drawing will show in schematic fashion the preferred control system. I have felt for simplicity that it is better to separate the showings of Figs. 4 and 5 and the other diagrammatic figures and that the result will be understandable in connection with the following description. At 29 I show a flow measuring instrument connected across an orifice 30 for measuring the rate of flow of recirculated gases through the duct 16.

In the present arrangement the bolometer 23 is sensitive to gas temperatures at location B and is arranged to activate a recorder-controller 28 to give a representation of the average temperatures of the gases across the location B. This provides an index of heat available for superheating the steam. Many factors may contribute to variation of temperature of the gases entering the convection heating surfaces. Change in demand, with consequent increase or decrease in fuel-air admission rate would change the gas mass flow as well as its velocity and temperature. As an index of demand I show the Bourdon tube 19, sensitive to steam pressure. The demand index may be rating, such as steam flow rate or air flow rate, and may include a basic control of the fuel and air to the unit in accordance with demand or load upon the unit. For steady state demand, the furnace exit gas temperature may vary from such causes as flame waver resulting in varying generating surface absorption, slagging or deslagging of generating surface, burnability of the fuel, etc. Regardless of the cause of the variation, the fact remains that a variation in such temperature may cause an undesired deviation in final steam temperature from the desired value.

The temperature of the gases at the entrance to the superheating surface is therefore a "cause" index materially in time advance of any "effect" index such as metal or steam temperature of the superheating surfaces. By utilizing such "cause" index I may anticipate its effect upon the final steam temperature and provide an initial coarse adjustment to be verniered by final steam temperature toward the desideratum.

In Fig 3 I show the characteristic curve of such a convection superheater designed for final steam temperature of 1000 FTT under rated load operaton. It will be seen that desired control operation is to remove the possibility of excess steam temperature at the higher ratings and to raise the deficient steam temperature at the lower ratings. In general I accomplish this by either removing excess heat by spray attemperation or through by-passing the gas around some superheating surface at the higher ratings while, at the lower ratings, I raise the characteristic temperature through proportioning the generating and superheating surfaces by the recirculation of partially cooled products of combustion. I have shown that the expected characteristic curve of convection superheating surface crosses the desired 1000 FFT final steam temperature line at "rated load" and rises to a value of approximately 1050 FFT at "peak load." The shaded area between rated load and peak load represents the operating area of the gas by-pass or spray attemperator to prevent excessive heat being applied to the superheating surfaces over that rating range or to absorb from the excessively heated steam some of the excess heat. The shaded area below "rated load" indicates the deficiency of heat in the final steam if the expected characteristic curve were experienced. This shaded area indicates the additional heat desirably to be supplied to the entrance to the superheating surfaces to raise the final steam temperature to the desired value of 1000 FFT. This is preferably accomplished through gas recirculation. The control systems later to be described are designed to accomplish this result automatically. The method may be accomplished manually or through apparatus other than that which is herein disclosed.

Figure 5:
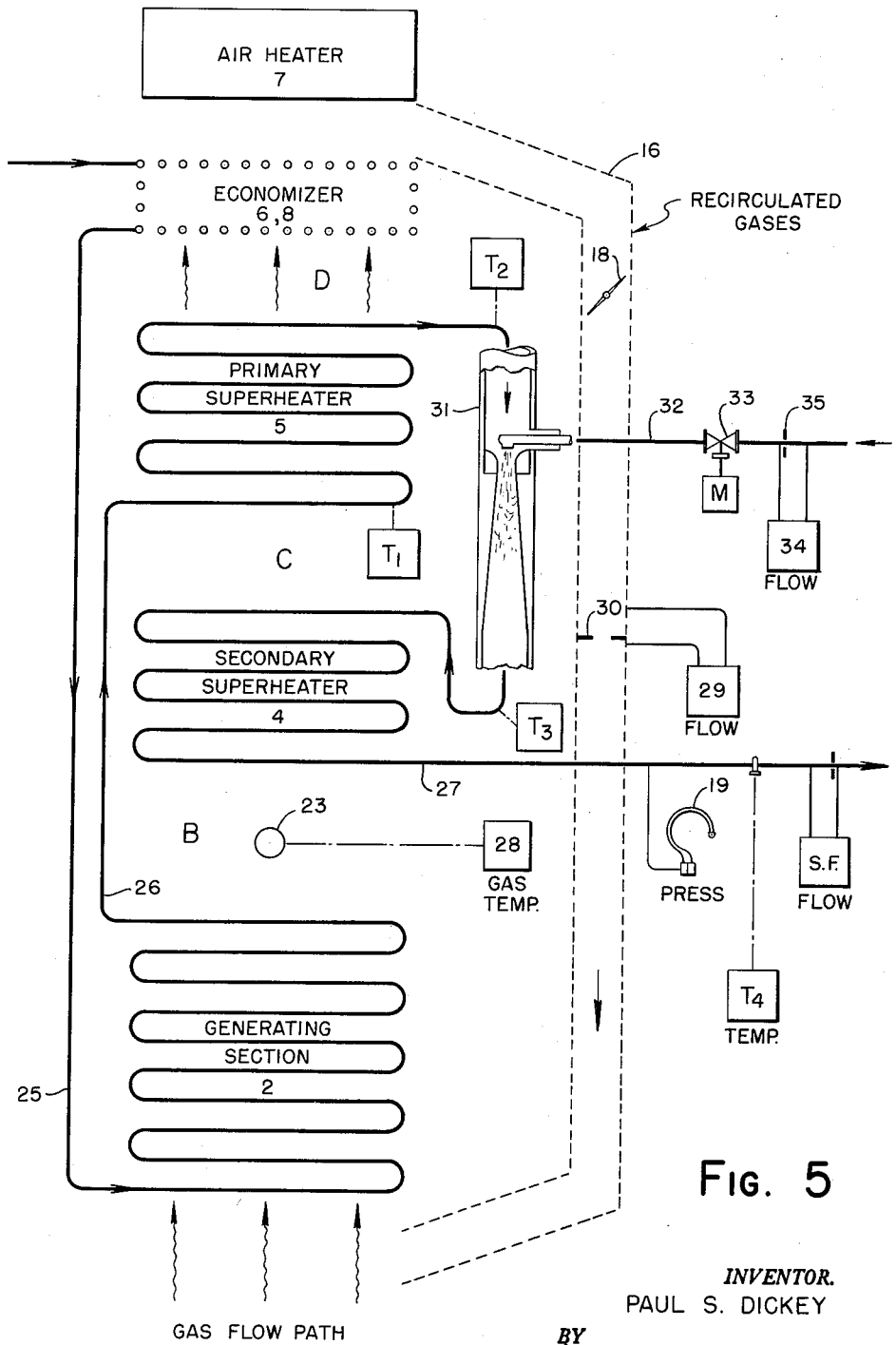
Fig. 5 is a schematic showing of the invention in connection with an attemperator and gas recirculation.

Referring now to Fig. 5 I show therein an arrangement somewhat similar to that of Fig. 4 but utilizing a spray attemperator between the primary superheater 5 and the secondary superheater 4 to remove excess heat from the steam, as an alternate to the gas by-pass by Fig. 4. The general operation is the same and the function (Fig. 3) of the attemperator in the one case, and of the by-pass damper in the other case, is to prevent final steam temperature from rising above the desired value at peak loads. With the by-pass damper control of Fig. 4 some of the heating gases, heated at excessive temperature, are by-passed around superheating surface. With the arrangement of Fig. 5 all of the gases are allowed to pass through the superheating surfaces but some of the excessive heat in the steam is extracted by spray attemperation between the superheaters.

In Fig. 5 I locate an attemperator 31 in the steam conduit between the primary superheater and the secondary superheater. The attemperator is preferably of the type disclosed in the patent to Fletcher et al. No. 2,550,683 wherein the superheated steam conduit has therein a venturi acting as a part of a thermal sleeve to protect the conduit against thermal stresses. Forwardly of the entrance of the venturi is a spray nozzle through which water is atomized in a conical spray which is enveloped by the high velocity superheated steam. The nozzle is thus disposed in a relatively low velocity zone so that there is a low pressure loss due to turbulence created by the nozzle body. The water leaves the nozzle in the form of a spray cone with a hollow vortex, the outer limits of the cone being within the entrance surfaces of the venturi.

Water for the attemperator spray is supplied through a conduit 32 under the control of a valve 33. The rate of supply of water is measured by a rate of flow meter 34 connected across an orifice 35 in the conduit 32.

Figure 6:
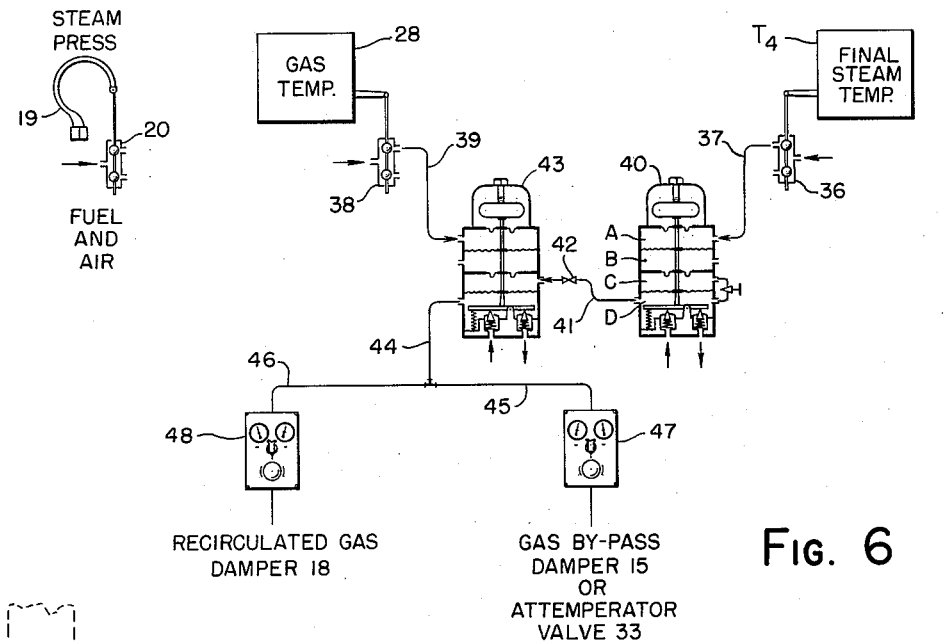
Fig. 6 is a schematic showing of a basic control system useful in connection with either of Figs. 4 or 5.

Fig. 6 diagrammatically illustrates the control system utilizing a control of gas recirculation in combination with either gas by-passing damper operation or with water spray attemperation; in either simultaneous or desired sequential operation. Thus the control system of Fig. 6 may be said to be related to Figs. 4 and 5 wherein are shown respectively the gas by-pass and the spray attemperation structures.

With reference to Fig. 3 it will be understood that an operation with rating may be accomplished in two different manners. The gas recirculation control and the gas by-pass control (or attemperation) may be substantially end-to-end sequentially as is theoretically indicated in Fig. 3 so that the gas recirculation control (upon increase in rating) ceases at the "rated load" line and the gas by-pass (or attemperation) control immediately begins. As a matter of fact, as soon as the gas by-pass damper 15 begins to open there is an initial flow therethrough. The same is probably true of the attemperator water supply. Furthermore, when the gas recirculation fan is started there is of course a minimum flow through the recirculation duct 16. In other words, gas recirculation control can hardly be expected to fade out to zero at "rated load" and the gas by-pass (or attemperation) control to start from zero. Each of these will probably have a finite value of starting and ending.

From a practical standpoint the control system will probably be adjusted to have a slight overlap so that when gas recirculation has stopped, there will have already been some slight opening of the gas by-pass damper (or of the attemperator valve) and vice versa. Conversely, it may be desirable (rather than having an overlap) to have a slight gap between the stopping of gas recirculation and the beginning of gas by-passing or attemperation. The control system provides adjustability for any desired combination of such controls.

In Fig. 6 I indicate that steam pressure as an index of demand, acting through the agency of the Bourdon tube 19, positions the movable element of a pilot valve 20 to control the supply of fuel and air to the unit to satisfy demand. The pilot valve 20 is of a known type as disclosed in the Johnson Patent 2,054,464 and is so arranged that the air loading pressure output of the pilot valve 20 is continuously established representative of steam pressure as an index of demand.

The final steam temperature measuring device $T_4$ is arranged to position the movable element of a pneumatic pilot valve 36 establishing in the pipe 37 a fluid loading pressure continuously representative of final steam temperature $T_4$. Similarly the gas temperature measuring device 28 is arranged to position the movable element of a pneumatic pilot valve 38 thereby continuously establishing in a pipe 39 a fluid loading pressure representative of the average gas temperature across the location B at the entrance to the superheating surfaces.

It will be seen that the air pressure loading pipe 37 joins the A chamber of a standardizing relay 40 which may be of the type described and claimed in the Gorrie Patent Re. 21,804 and whose output communicates with a pipe 41. Such a relay provides a proportional control with reset characteristics. It provides for the final control index (final total steam temperature), a floating control of high sensitivity superimposed upon a positioning control of relatively low sensitivity. A function of the adjustable bleed connection in the relay 40 is to supplement the primary control of the pressure effective in pipe 37 with a secondary control of the same or of different magnitude as a follow-up or supplemental action to prevent over-travel and hunting.

The output of the relay 40, available through the pipe 41, is admitted through an adjustable bleed valve 42 to the C chamber of an averaging relay 43, to the A chamber of which is connected the pipe 39. The relay 43 may be of the type described and claimed in my Patent 2,098,913.

The output of relay 43 is available in a pipe 44 branched as at 45, 46 to control mechanisms for positioning the gas by-pass damper (or attemperator valve) and the recirculated gas damper respectively. Positioned in the pipes 45, 46 are manual-automatic selector valves 47, 48 respectively which are preferably of the type disclosed in the patent to Fitch 2,202,485 providing a possibility of hand or automatic control of the damper 15 (or valve 33) or of the recirculated gas damper 18 respectively.

The necessary, and known, adjustments are provided in the recorders-controllers 28, $T_4$ as well as in the relays 40, 43 and in the control mechanisms for positioning the damper 15, valve 33, or damper 18, to the end that the by-pass damper and recirculation damper, or the attemperator valve and recirculation damper, may be biased the one relative to the other or may be sequentially operated responsive to the control indexes. For example, the loading pressure values available in the averaging relay 43, from pipes 41 and 39, may be so adjusted that the recirculation will be operative through certain ranges and then sequentially the by-pass damper or attemperator valve will be moved. The sequence may be a successive one or with adjustable overlap.

The operation of Fig. 6 taken in connection with Fig. 4 is as follows: It will be understood that the response rate of bolometer 23 and its recorder-controller 28 may be adjusted to rapidly fluctuating gas temperatures to produce an averaging effect, if desired. Assuming a steady state of operation, an increase in temperature at location B indicates an increase of heat available for superheating the steam and it may be assumed that such an increase would cause an undesirable increase in steam final temperature at location $T_4$. Thus I provide that an increase in temperature at location B will increase the loading pressure value with pipe 39 and within the A chamber of relay 43. This produces an increase in pressure within the D chamber of the relay and in the pipes 44, 45 and 46. Preferably, an increase in pressure in pipe 46 actuates the necessary control drive to tend to close off the recirculation damper 18 thus increasing the heat absorption of the generating surface and abstracting some of the available heat from the furnace gases prior to their reaching location B.

The components of this system may be so adjusted that, after the recirculation damper 18 has been closed (and the recirculation fan 17 tripped off) the travel of that control element will cease and the control drive positioning the by-pass damper 15 will begin to open the by-pass damper and thus by-pass some of the available heating gases around at least a portion of the superheating surface.

Assuming for the moment that the temperature of the entering gases at location B is unvarying, then an increase in final steam temperature at location $T_4$ results in an increase in air loading pressure in pipe 37 and in the A chamber of relay 40, and correspondingly in pipe 41 which joins the C chamber of relay 43 through an adjustable restriction 42. An increase in air loading pressure in the C chamber of relay 43 acts in the same direction as an increase in air pressure within chamber A and, as previously explained, results in a closing of the recirculation damper 18 and later an opening of the by-pass damper 15.

Conversely, a decrease in gas temperature at location B, or a decrease in final steam temperature, results in a closing off of the gas by-pass damper 15, and an opening of the recirculation damper (accompanied by a starting of the recirculation fan 17) to decrease the generating surface heat absorption and raise the temperature of the gases entering the superheating surface.

In Fig. 7 I show an arrangement in some respects similar to that of Fig. 6 but incorporating refinements thereover. The control of the gas by-pass damper 15 is conjointly under the control of gas temperature and final steam temperature as in Fig. 6. In this embodiment I introduce a measure of the flow rate of the recirculated gas in the control of recirculation. Positioned in the recirculation duct 16 is an orifice 30 for producing a pressure differential representative of the rate of flow of recirculated gas and to which pressure differential the flow meter 29 is continually responsive. The meter 29 positions the movable element of a pilot valve 50 thereby continuously establishing in a pipe 51 a fluid loading pressure representative of the flow rate of recirculated gas.

I provide at 52 a differential standardizing relay, to the A chamber of which is connected the pipe 44 carrying the output of averaging relay 43. To the D chamber of relay 52 I connect the pipe 51 thus providing that the relay 52 is subjected to the differential action of the loading pressures within pipes 44 and 51. The output of the relay is available through the pipe 46 and selector valve 48 to a control drive or motor 53 for positioning the damper 18 in the recirculation duct 16.

In the system of Fig. 7 the recirculated gas flow rate index provides a tie-back to insure that the correct amount of recirculated gas is obtained to accomplish the purpose desired. The relay 52 receives in its A chamber a loading pressure representative of desired damper 18 positioning called for by the indexes, gas temperature and final steam temperature. To this loading pressure is opposed the loading pressure representative of actual gas flow rate, subjected upon the B chamber of the relay 52, to the end that if the recirculation gas flow rate is as desired, the two loading pressures will tend to neutralize each other and no change in the loading pressure within the pipe 46 will be made. If, however, the pressure in chamber A or that in chamber B deviates, then the differential between the pressure effects in the chambers A and B will be effective to vary the loading pressure within the pipe 46, effective in positioning the damper 18, until the increased or decreased rate of flow of recirculated gas through the conduit 16, acting through the flow meter 29 and pipe 51, again brings the relay 52 into a balanced condition.

The arrangement of Fig. 8 is in some respects similar to that of Fig. 7 in that three variables in the operation of the unit cooperate in the control. The recirculating gas flow rate, the gas temperature at the entrance to the superheater surfaces, and the final steam temperature, are used in the positioning of the recirculating damper 18 and of the by-pass damper 15. Additionally the superheat damper 14 is operatively included in the control system under the dominance of the three variables mentioned. In place of the temperature of the gases entering the superheating surfaces, I herein may use some other index of rating such as air flow or steam outflow rate. In other words, in this figure, the measuring-controller 28 may be responsive either to gas temperature, air flow, or steam outflow rate. In thus speaking of air flow, I intend to mean the products of combustion and excess air (exclusive of recirculated gases) as an indication of rating, and this may well be measured in known fashion by taking the pressure drop across a selected portion of the gas passages of the unit. On the other hand, it may be true air flow by being a measure of rate of flow of air supplied to promote combustion measured in the duct 12.

In Fig. 8 the output pipe 44 from the averaging relay 43 passes through a selector valve 55 to an output pipe 56 branched as at 57, 58. A pipe 56 joins a calibrating relay 59 while the pipe 57 passes through a reversing relay 60 to join a calibrating relay 61. The output of the calibrating relay 61 is available through the pipe 64 and selector valve 65 to position the superheater dampers 14. At the same time the output of the calibrating relay 59, available in the pipe 62 and selector valve 63, is arranged to position the by-pass damper 15. The other branch 58 of the output pipe 44 is connected to the B chamber of the relay 52, to the A chamber of which is connected pipe 51. The output pipe 46 of the relay joins the B chamber of a reversing relay 66 whose output, available in the pipe 67, acts through the selector valve 68 to position the recirculating gas damper 18. It will thus be evident that, through the agency of the calibrating relays 59, 61 and the reversing relay 60, the by-pass dampers 15 and the superheat dampers 14 may be simultaneously positioned in proper degree or may be sequentially operated.

The arrangement of Fig. 9 provides for incorporating in a control system the temperature $T_3$ at the outlet of the attemperator 31 as a further check of the effectiveness of the attemperation between the primary superheater 5 and the secondary superheater 4. Herein the recirculation gas damper 18 is under the conjoint control of recirculated gas flow meter 29, gas temperature index 28 and final steam temperature $T_4$. At the same time the attemperator valve 33 is under the conjoint control of gas temperature measuring device 28, steam temperature $T_3$, and final steam temperature $T_4$. The recirculation fan 17 is controlled from the loading pressures going to the damper 18 and valve 33 so that the fan 17 may be brought on and dropped off at proper sequential relation to attemperation.

Steam temperature device $T_3$ is arranged to position the movable element of a pilot 70 to establish in the pipe 71 a fluid loading pressure continuously representative of the value of $T_3$. The pipe 71 joins the B chamber of a relay 72, to the A chamber of which is connected the pipe 39 from gas temperature measuring device 28. The output of the relay is available in a pipe 73 joining the A chamber of a relay 74. The final steam temperature measuring controller $T_4$ has its loading pressure in pipe 37 branched as at 75 to join the B chamber of the relay 74. The output pipe 77 of the relay leads to the attemperator valve 33 and to a fan controlling device 80.

The gas temperature measuring device 28 is provided with another pilot 81 establishing in a pipe 22 a fluid loading pressure continuously representative of gas temperature. The pipe 82 joins the B chamber of a relay 83 to whose A chamber is connected the pipe 51. The output of the relay 83 is available in a pipe 84 joining the C chamber of a relay 85 to the A chamber of which is connected the branch pipe 76 from the device $T_4$. The output of the relay 85, available in a pipe 86, goes to the controller of damper 18 and to the recirculation fan control 80.

It will be apparent, from a study of Fig. 9, that recirculating gas flow is under the primary control of gas temperature as an index of rating, secondarily under the control of a measurement of the actual gas flow rate, and with a final check-back from the final index ($T_4$) the final total steam temperature. At the same time the attemperator valve is under the primary control of the gas temperature or rating index with secondary control from temperature of the steam at the outlet of the attemperator as a measurement of what has been accomplished by the attemperation, and with a final check-back from the final steam temperature $T_4$. The recirculating fan 17 is under the control of the device 80 which is sensitive to the loading pressures in pipes 77, 86 so that the fan 17 is started and stopped at the proper times.

Fig. 10 depicts a control system wherein the gas recirculating damper 18 and the attemperator water valve 33 are under the conjoint control of gas temperature, steam temperature $T_3$, and final steam temperature $T_4$. The final steam temperature loading pressure in pipe 37 is admitted to the A chamber of standardizing relay 40 whose output pipe 41 joins the A chamber of an averaging or differential relay 90, to the B chamber of which is connected the output pipe 71 from temperature controller $T_3$, and to the C chamber of which is connected the output pipe 39 of the gas temperature measuring controller 28. The resultant of the three control effects is available in the output pipe 91 which branches as at 92, 93 through selector valve 94, 95 respectively, to join the calibrating relays 96, 97. The output of the calibrating relay 96 is arranged to position the attemperator water control valve 33A while the output of the calibrating relay 97 is arranged to position the gas recirculation damper 18. Through the agency of the calibrating relays 96, 97 and other adjustabilities of the system including the positioner 98 of the water valve 33A the proper sequential operation of the recirculation and attemperation is accomplished.

In the system of Fig. 11 I introduce a water flow rate index to take care of feed pump variations, etc. which might otherwise affect the amount of water supplied to the attemperator 31 for any given control pressure subjected upon the pipe 103 leading to the positioner 98 of the valve 33A. In other words, the water flow rate index provides a tie-back to insure that the correct amount of water is used for spray attemperation to accomplish the purpose desired.

The standardizing relay 102 receives in its A chamber the output pressure of pipe 44 from the relay 43 and in its B chamber the output pressure from a pipe 101.

A water flow meter 34 connected across the orifice 35, positions the movable element of a pilot 100 to establish in the pipe 101 a fluid loading pressure continuously representative of rate of water flow through the conduit 32. Thus the relay 102 receives in its A chamber a loading pressure representative of desired water valve positioning called for by the indexes, gas temperature and final steam temperature. To this loading pressure is opposed the loading pressure representative of water flow rate, subjected upon the B chamber of the relay 102, to the end that if the water flow rate is as desired, the two loading pressures will tend to neutralize each other and no change in the control pressure within the pipe 103 will be made. If, however, the pressure in chamber A or that in chamber B deviates, then the differential between the pressures in chambers A and B will be effective to vary the control pressure within the pipe 103, effective in positioning the valve 33A, until the increased or decreased rate of flow of water through the pipe 32, acting through the flow meter 34 and pipe 101, again brings the relay 102 to a balance condition.

Referring now to Fig. 12 I show therein a somewhat different arrangement wherein I provide a control index representative of the total available heat at the entrance to the superheating surfaces, namely, an index representative of gas volume multiplied by its average temperature as indicative of its B.t.u. content.

An air flow meter 105 is responsive to the pressure differential existing across two points of the generating unit or may be connected across an air heater or other fixed restriction in the path of the excess air and products of combustion flowing through the unit. In this particular instance it desirably includes the recirculated gases so as to constitute a measure of all of the gas volume entering the convection superheating surfaces. It is only important that the meter 105 provide a continuous rate measure of the total excess air and products of combustion passing the location B at the entrance to the superheating surfaces.

The electronic calculating circuit of Fig. 12 is disclosed in the Hornfeck Patent 2,636,151 providing a result which is the product of air flow rate times gas temperature in terms of total heat available on a rate basis.

The flow meter 105 is arranged to continually position the movable core 106 of a transformer relative to an alternating current energized primary 107 and inductive secondaries 108, 109 and 110. Across the bucking secondaries 109, 110 is an adjustable resistance 111 whose movable contact 112 is positioned by the gas temperature controller 28. The elements 109, 110, 111, 112 are connected in a balanceable network including a resistance 113 and an adjustable contact 114 whose function is to balance the network. Upon displacement of the core 106 and/or the contactor 112 from a given position, the network becomes unbalanced and the unbalance is effective upon an amplifier 115 arranged to activate a motor 116 in one direction or the other for positioning the contactor 114 in proper direction and extent to rebalance the network. The particular characteristics of this network are such that the position of the contact 114 and the movable element 117 of a pilot valve 118 are representative of the product of air flow times gas temperature and may be calibrated in terms of B.t.u. rate. The pilot 117 continuously establishes in a pipe 119 an air loading pressure representative of heat availability at the entrance to the superheating surfaces and the pipe is joined to the A chamber of the averaging relay 43, to the C chamber of which is connected the pipe 41 carrying a loading pressure established by the final steam temperature controller $T_4$. The output of relay 43 is effective through a pipe 44 and selector valve 48 to position the recirculated gas damper 18. The operation of Fig. 12 is in general one of positioning the recirculation gas damper responsive to a continuous indication of heat availability at the entrance to the superheating surfaces with a checkback from actual final steam temperature.

In Fig. 13 I have schematically illustrated certain indicating instrumentalities useful as a guide for manual remote control of the variable operating factors to allow manual operation of the unit in accordance with my new methods.

The Bourdon tube 19 is sensitive to generated vapor pressure and provides a visual indication thereof on a scale 19A. The indicating-recording meters 34, 28, 29, SF, 105, $T_4$ provide visual manifestations of water flow rate, gas temperature, recirculated gas flow, steam flow rate, air flow rate, and final steam temperature, respectively. Similarly, the indicators $T_1$, $T_2$, and $T_3$ provide visual manifestations of the steam temperature at the designated locations (Fig. 5). The points of measurement of these operational variables may be widely scattered but I preferably group the indicators at a central location having a Manual Control Station 130. 131 represents the usual electric motor or motors for fuel supply control to pulverizer mills. 132 indicates a motor for controlling secondary air to support combustion. While this is designated as secondary air it also includes the primary air which may be the carrier for the pulverized coal in suspension. 53 and 54 are motors for positioning the dampers 18 and 15. 33 represents a motor operated attemperator valve as previously indicated.

The control station 130 is usually centrally located and is provided with electrical switches, etc., for controlling the motors and devices mentioned. 133 represents a Forward-Reverse-Stop electric pushbutton station for controlling the motor 131. Similar pushbutton stations are illustrated in connection with the other control motors. The stations may be equipped with signal lights and if necessary with speed controlling rheostats.

It will now be clear that my improved methods of operation of the unit may be manually performed by an operator located at the Manual Control Station 130, observing the measuring instrumentalities, and selectively remotely activating the controls 131, 132, 53, 54 and 33. Selective and sequential operation may be obtained as well as proper proportioning of the gases between the bypass and superheat passages.

It is understood in this art that either vapor outflow rate or air flow rate may be used as an index of output or rating. The control system which I have illustrated and described finds, at the moment, its widest applicability in the burning of pulverized fuel but it is equally effective in connection with vapor generating and superheating units adapted to be fired by any fuel burned in suspension including gas or vaporized oil.

While I have described in detail arrangements incorporating a continuous determination of gas temperature at location B through the agency of a bolometer, it will be appreciated that I contemplate the use at location B of any temperature sensitive device or devices which will provide a continuous determination of the temperature of the gases available to the entrance to the superheating surfaces as clearly distinguished from any metal temperature or temperature of the stream or other fluid within the heat transfer surfaces. Furthermore, I contemplate that under certain conditions of operation it may be highly desirable to utilize in my method and control apparatus a determination of temperature of the gas flowing stream at other locations for example at A, C or D.

What I claim as new, and desire to secure by Letters Patent of the United States, is:

1. In a vapor generating and superheating unit of the type having a fluid-cooled combustion zone with a heating gas outlet in one end portion thereof having convection vapor superheating surfaces positioned beyond the combustion zone outlet in the path of heating gas flow, the method of operation which includes introducing fluent fuel and air for combustion into the combustion zone spaced from the heating gas outlet, regulating the total rate of fuel and air supply in accordance with an index of demand upon the unit, increasing the heat availability of the heating gases leaving the heating gas outlet to the convection heating surfaces as rating decreases through increasingly recirculating a portion of the partially cooled gases from the heating gas path beyond the superheating surfaces back to the combustion zone and thus tending to raise final vapor temperature, by-passing a controllable portion of the heating gases around at least a portion of the superheating surfaces, and controlling both the recirculation and the by-passing continuously responsive to a determination of temperature of the heating gases entering the superheating surfaces in direction tending to decrease recirculation rate or increase the by-passing as the heating gas temperature increases and vice versa.

2. In a vapor generating and superheating unit of the type having a fluid-cooled combustion zone with a heating gas outlet in one end portion and having convection superheating surfaces positioned beyond the combustion zone in the direction of heating gas flow, the method of operation which comprises, introducing fuel and air for combustion into the combustion zone at a rate to satisfy demand upon the unit, increasing the heat availability of the gases leaving the outlet as rating decreases through a lower range of rating by recirculating partially cooled products of combustion from the heating gas path beyond the superheating surfaces back to the combustion zone, maintaining optimum final vapor temperature through controllably by-passing some of the heating gases around at least a portion of the superheating surfaces through an upper range of ratings, and regulating the recirculation rate of gases and the by-passing of gases in accordance with temperature of the heating gases entering the superheating surfaces in direction tending to decrease recirculation rate or increase the by-passing as the temperature of the heating gases increases.

3. The method of claim 2 including sequentially regulating the recirculation through a lower range and the by-passing through an upper range of operating ratings with an overlapping of the regulation across the rated load unit operation.

4. The method of claim 2 including sequentially regulating the recirculation through a lower range and the by-passing through an upper range of operating ratings with one becoming ineffective before the other becomes effective.

5. In a vapor generating and superheating unit of the type having a fluid-cooled combustion zone with a heating gas outlet in one portion and having convection superheating surfaces positioned beyond the combustion zone in the direction of heating gas flow, the method of operation which comprises, introducing fuel and air for combustion into the combustion zone at a rate to satisfy demand upon the unit in direction to increase supply rate of fuel and air as demand increases and vice versa, increasing the heat availability of the gases leaving the outlet as rating decreases through a lower range of rating by increasingly recirculating partially cooled products of combustion from the heating gas path beyond the superheating surfaces back to the combustion zone and thus tending to raise final superheated vapor temperature, removing any excess heat from the superheated vapor to maintain an optimum final vapor temperature over an upper range of ratings through liquid spray attemperation of the vapor, and regulating the recirculation rate of gases and the attemperation in accordance with temperature of the heating gases entering the superheating surfaces in direction tending to decrease recirculation rate or increase the liquid spray attemperation as the heating gas temperature increases and vice versa.

6. The method of claim 5 including sequentially regulating the recirculation through a lower range and the attemperation through an upper range of operating ratings with an overlapping of the regulation across the rated load unit operation.

7. The method of claim 5 including sequentially regulating the recirculation through a lower range and the attemperation through an upper range of operating ratings with one becoming ineffective before the other becomes effective.

8. In a vapor generating and superheating unit of the type having a fluid-cooled combustion zone with a heating gas outlet in one end portion thereof and having convection vapor superheating surfaces positioned beyond the combustion zone outlet in the path of heating gas flow, the method of operation which includes introducing fluent fuel and air for combustion into the combustion zone spaced from the heating gas outlet, regulating the total rate of fuel and air supply in accordance with an index of demand upon the unit, increasing the heat availability of the heating gases leaving the heating gas outlet to the convection heating surfaces as rating decreases through recirculating a portion of the partially cooled gases from the heating gas path beyond the superheating surfaces back to the combustion zone over a range of lower ratings, by-passing a controllable portion of the heating gases around at least a portion of the superheating surfaces over a range of upper ratings, continuously controlling both the recirculation and the by-passing responsive to a determination of temperature of the gases leaving the combustion zone, and sequentially effecting the controlling so that the recirculation is accomplished over a lower range of ratings and the by-passing over an upper range of ratings without material overlapping of the regulation across the rated load unit operation in direction tending to decrease recirculation rate or increase the by-passing as the temperature of the gases leaving the combustion zone increases.

9. Apparatus for generating and superheating vapor including in combination, a furnace having fluid-cooled walls and a heating gas outlet in one portion thereof, a convection superheater positioned beyond the gas outlet in the path of heating gas flow leaving the furnace, a controllable supply of the elements of combustion for the furnace, control means for the supply means sensitive to demand upon the unit in direction tending to increase supply rate as demand increases, fan and duct means arranged to recirculate heating gas from a location beyond the superheater back to the furnace to affect heat availability of the heating gases passing over the superheating surfaces, means for limiting final superheated vapor temperature from exceeding a predetermined value, a measuring apparatus continuously determining temperature of the heating gases leaving the furnace, and adjusting means for the fan and duct means and the limiting means responsive to the temperature determining means and acting in direction tending to decrease recirculation or increase the limiting as the said temperature increases and vice versa.

10. The combination of claim 9 wherein the limiting means consists of a gas by-pass around at least a portion of the superheating surfaces.

11. The combination of claim 9 wherein the limiting means consists of a liquid spray attemperator for the vapor produced by the unit.

12. The combination of claim 9 including sequentially responsive means for the said adjustment means arranged to actuate the fan and duct recirculating means over a range of lower ratings and to actuate the limiting means over a different range of upper ratings.

13. Apparatus for generating and superheating vapor including in combination, a furnace having fluid-cooled walls and a heating gas outlet in one portion thereof, a convection superheater positioned beyond the gas outlet in the path of heating gas flow leaving the furnace, a controllable supply of the elements of combustion for the furnace, control means for the supply means sensitive to demand upon the unit in direction tending to increase supply rate as demand increases, fan and duct means arranged to recirculate heating gas from a location beyond the superheater back to the furnace to affect heat availability of the heating gases passing over the superheating surfaces, means for limiting final superheated vapor temperature from exceeding a predetermined value, a measuring apparatus continuously determining temperature of the heating gases leaving the furnace, measuring means continuously determining final vapor temperature, and adjusting means for both the fan and duct means and the limiting means conjointly responsive to both the measuring apparatus and the measuring means and acting in direction tending to decrease recirculation rate or increase the limiting as either the gas temperature or the vapor temperature increases and vice versa.

14. The combination of claim 13 wherein the limiting means consists of a gas by-pass around at least a portion of the superheating surfaces.

15. The combination of claim 13 wherein the limiting means consists of a liquid spray attemperator for the vapor produced by the unit.

16. Apparatus for generating and superheating vapor including in combination, a furnace having fluid-cooled walls and a heating gas outlet in one portion thereof, a convection superheater positioned beyond the gas outlet in the path of heating gas flow leaving the furnace, a controllable supply of the elements of combustion for the furnace, control means for the supply means sensitive to demand upon the unit in direction tending to increase supply rate as demand increases, fan and duct means arranged to recirculate heating gas from a location beyond the superheater back to the furnace to affect heat availability of the heating gases passing over the superheating surfaces, means for limiting final superheated vapor temperature from exceeding a predetermined value, a measuring apparatus continuously determining temperature of the heating gases leaving the furnace, measuring means continuously determining final vapor temperature, a meter of recirculated gas flow rate, adjusting means for the fan and duct recirculating means conjointly responsive to the measuring apparatus, the measuring means and the meter in direction tending to decrease recirculation rate as either the gas temperature or the vapor temperature increases and vice versa while increasing or decreasing recirculation rate when measured rate decreases or increases from desired value; and regulating means for the limiting means conjointly responsive to the measuring apparatus and the measuring means in direction tending to increase the limiting as either the gas temperature or the vapor temperature increases and vice versa.

17. The combination of claim 16 wherein the limiting means is a controllable by-pass for a portion of the heating gases around at least a portion of the superheating surfaces.

18. Apparatus for generating and superheating vapor including in combination, a furnace having fluid-cooled walls and a heating gas outlet in one portion thereof, a convection superheater positioned beyond the gas outlet in the path of heating gas flow leaving the furnace, a controllable supply of the elements of combustion for the furnace, control means for the supply means sensitive to demand upon the unit in direction tending to increase supply rate as demand increases, fan and duct means arranged to recirculate heating gas from a location beyond the superheater back to the furnace to affect heat availability of the heating gases passing over the superheating surfaces, a water spray attemperator for the superheated vapor to absorb excess heat from the vapor and thus limit the final superheated vapor temperature from exceeding a predetermined value, a temperature determining means for the final superheated vapor, a temperature measuring device for the heating gases entering the superheater surfaces, a flow rate meter for the attemperator water, regulating means for the recirculating means conjointly responsive to the first and second measuring instrumentalities in direction tending to decrease recirculation rate as either gas temperature or vapor temperature increases and vice versa, and control means for the attemperation water flow rate conjointly responsive to all three measuring instrumentalities in direction tending to increase attemperation when either gas temperature or vapor temperature increases while increasing or decreasing attemperation when measured attemperation rate decreases or increases respectively from desired value.

19. In a vapor generating and superheating unit of the type having a fluid-cooled combustion zone with a heating gas outlet in one portion and having convection superheating surfaces positioned beyond the combustion zone in the direction of heating gas flow, the method of operation which comprises, introducing fuel and air for combustion into the combustion zone at a rate to satisfy the demand upon the unit and in direction to increase supply rate as demand increases and vice versa, increasing the heat availability of the gases leaving the outlet as rating decreases through a lower range of rating by increasingly recirculating partially cooled products of combustion from the heating gas path beyond the superheating surfaces back to the combustion zone and thus tending to raise final superheated vapor temperature, limiting final superheated vapor temperature from exceeding a predetermined value through an upper range of ratings, the temperature limiting being accomplished by liquid spray attemperation of the superheated vapor, and regulating both the recirculation rate of gases and the temperature limiting conjointly responsive to a determination of temperature of the heating gases entering the superheating surfaces and to a determination of the final vapor temperature in direction tending to decrease recirculation rate or increase the limiting effect as either the gas temperature or the vapor temperature increases and vice versa.

20. In a vapor generating and superheating unit of the type having a fluid-cooled combustion zone with a heating gas outlet in one portion and having convection superheating surfaces positioned beyond the combustion zone in the direction of heating gas flow, the method of operation which comprises, introducing fuel and air for combustion into the combustion zone at a rate to satisfy demand upon the unit, increasing the heat availability of the gases leaving the outlet as rating decreases through a lower range of ratings by increasingly recirculating partially cooled products of combustion from the heating gas path beyond the superheating surfaces back to the combustion zone, limiting final superheated vapor temperature from exceeding a predetermined value through an upper range of ratings by by-passing a portion of the heating gases around at least a portion of the superheating surfaces, and regulating both the recirculation rate of gases and the by-passing rate conjointly responsive to a determination of temperature of the heating gases entering the superheating surfaces and to a determination of the final vapor temperature in direction tending to decrease recirculation rate or increase the by-passing rate as either the gas temperature or the vapor temperature increases and vice versa.

21. In a vapor generating and superheating unit of the type having a fluid-cooled combustion zone with a heating gas outlet in one portion and having convection superheating surfaces positioned beyond the combustion zone in the direction of heating gas flow, the method of operation which comprises, introducing fuel and air for combustion into the combustion zone at a rate to satisfy demand upon the unit in direction to increase supply rate as demand increases and vice versa, increasing the heat availability of the gases leaving the outlet as rating decreases through a lower range of ratings by increasingly recirculating partially cooled products of combustion from the heating gas path beyond the superheating surfaces back to the combustion zone and thus tending to raise final superheated vapor temperature, determining the heat availability of the gases leaving the outlet by measuring the total heating gas flow rate to the heating surfaces related to a continuous determination of the temperature of the same gases, measuring the final vapor temperature, and controlling the recirculation rate in accordance with the final vapor temperature and the determined heat availability of the gases in direction tending to increase the recirculation rate as either determined heat availability or measured final vapor temperature increases and vice versa.

22. Apparatus for generating and superheating vapor including in combination, a furnace having fluid-cooled walls and a heating gas outlet in one portion thereof, a convection superheater positioned beyond the gas outlet in the path of heating gas flow leaving the furnace, a controllable supply of the elements of combustion for the furnace, control means for the supply means sensitive to demand upon the unit in direction tending to increase supply rate as demand increases and vice versa, recirculating means arranged to recirculate heating gas from a location beyond the superheater back to the furnace to affect the heat availability of the heating gases passing over the superheating surfaces, measuring means continuously obtaining the product of flow rate of gases entering the superheater surface and their average temperature, other measuring means continuously determining the final superheated vapor temperature, and means controlling the recirculating means in response to both said measuring means in direction tending to decrease the recirculation rate as either said product or final vapor temperature increases and vice versa.

References Cited in the file of this patent

UNITED STATES PATENTS

| | | |
|---|---|---|
| 1,387,463 | Broido | Aug. 16, 1921 |
| 1,938,699 | Huet | Dec. 12, 1933 |
| 2,081,948 | Michel et al. | June 1, 1937 |
| 2,098,913 | Dickey | Nov. 9, 1937 |
| 2,100,190 | Jackson | Nov. 23, 1937 |
| 2,170,347 | Dickey | Aug. 22, 1939 |
| 2,229,643 | De Baufre | Jan. 28, 1941 |
| 2,357,300 | Bailey | Aug. 5, 1944 |
| 2,526,843 | Birchler et al. | Oct. 24, 1950 |
| 2,526,898 | Powell et al. | Oct. 24, 1950 |
| 2,575,885 | Mittendorf | Nov. 20, 1951 |
| 2,590,712 | Lacerenza | Mar. 25, 1952 |
| 2,649,079 | Van Brunt | Aug. 18, 1953 |
| 2,737,930 | Rowand et al. | Mar. 13, 1956 |

FOREIGN PATENTS

| | | |
|---|---|---|
| 504,114 | Great Britain | Apr. 14, 1939 |
| 516,070 | Great Britain | Dec. 21, 1939 |
| 523,871 | Great Britain | July 24, 1940 |
| 612,841 | Great Britain | Nov. 18, 1948 |

OTHER REFERENCES

B & W Bulletin G67 of 1949, page 30.

UNITED STATES PATENT OFFICE
CERTIFICATE OF CORRECTION

Patent No. 2,985,153                                    May 23, 1961

Paul S. Dickey

It is hereby certified that error appears in the above numbered patent requiring correction and that the said Letters Patent should read as corrected below.

Column 2, line 51, for "convention" read -- convection --; column 5, line 44, strike out "important", second occurrence; line 49, before "17" insert -- fan --; column 8, lines 4, 6, and 17, for "FFT", each occurrence, read -- FTT --; line 27, for "by" read -- of --; same column 8, line 33, after "at" insert -- an --; column 10, line 17, for "with" read -- within --; column 14, line 60, for "stream" read -- steam --; line 71, after "thereof" insert -- and --; column 15, lines 5 and 6, strike out "increasingly"; lines 8 and 9, strike out "and thus tending to raise final vapor temperature".

Signed and sealed this 9th day of January 1962.

(SEAL)
Attest:

ERNEST W. SWIDER                                            DAVID L. LADD
Attesting Officer                                                Commissioner of Patents